Oct. 20, 1925.  
J. S. BOOTH  
TRANSMISSION  
Filed Nov. 6, 1924

Inventor  
James Scripps Booth  
By Stuart C Barnes  
Attorney

Oct. 20, 1925.  1,558,226
J. S. BOOTH
TRANSMISSION
Filed Nov. 6, 1924   2 Sheets-Sheet 2

Inventor
James Scripps Booth

By Stuart C Barnes
Attorney

Patented Oct. 20, 1925.

1,558,226

UNITED STATES PATENT OFFICE.

JAMES SCRIPPS BOOTH, OF DETROIT, MICHIGAN.

TRANSMISSION.

Application filed November 6, 1924. Serial No. 748,120.

*To all whom it may concern:*

Be it known that I, JAMES SCRIPPS BOOTH, a citizen of the United States, residing at Detroit, in the county of Wayne and State of Michigan, have invented certain new and useful Improvements in Transmissions, of which the following is a specification.

This invention relates to a transmission unit for motor vehicles especially such a unit when taken in connection with the floor layout of automobiles. It is the object of the invention to provide a transmission unit which permits the lowest possible position of the floor boards and a transmission unit in which the gear shifting lever is located in a position which removes it to a position nearer the dash of the car where it is very much less in the way of the occupants of the front seat.

$a$ designates the usual transmission case, $b$ the clutch housing in which is contained the usual fly wheel $c$ and any form of clutch; the one that happens to be shown here is the so-called single plate clutch $d$. In this type of power unit where the transmission case is bolted to the engine casting there is usually provided an opening covered by a plate for inspection and adjustment of the clutch. This place is located where my plate is located. In place of the common plate I provide a plate in the form of a casting which carries the gear shifting lever that will be more fully explained hereinafter.

The transmission gears are plainly shown in the transmission case, and they need not be described in detail for any suitable form of transmission can be used in connection with my invention. Suffice it is to say that $f$ designates the driven shaft and $g$ the counter shaft. The sliding gears $h$ and $i$ can be slid forward and backward to engage with the several gears shown to provide direct drive, low and intermediate speeds and the reverse drive.

In most sliding gear transmissions the sliding of these two gears backward and forward is effected by two separate shifting rods each carrying a gear shifting fork. These rods are ordinarily located in the transmission cover and are removable with the transmission cover. Ordinarily, the gear shifting lever is also located in the transmission cover and is of the ball and socket type. By rocking it from one side to the other it is caused to pick up either one shifting rod or the other and by pushing it forwardly or rearwardly it is caused to push the gear either forwardly or rearwardly.

Figure 1:
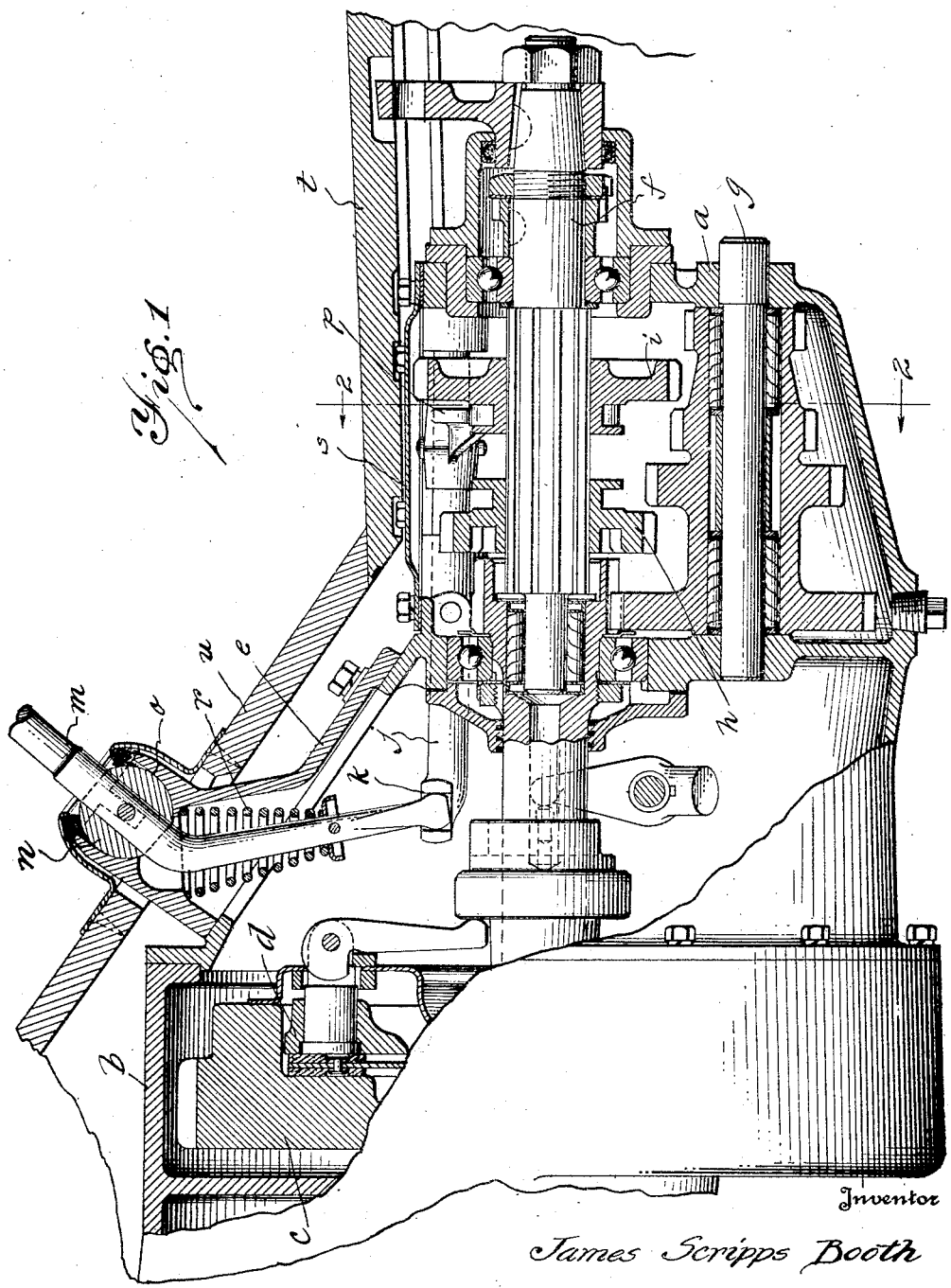
Fig. 1 is a vertical section through the transmission units and the floor boards.
Figure 2:
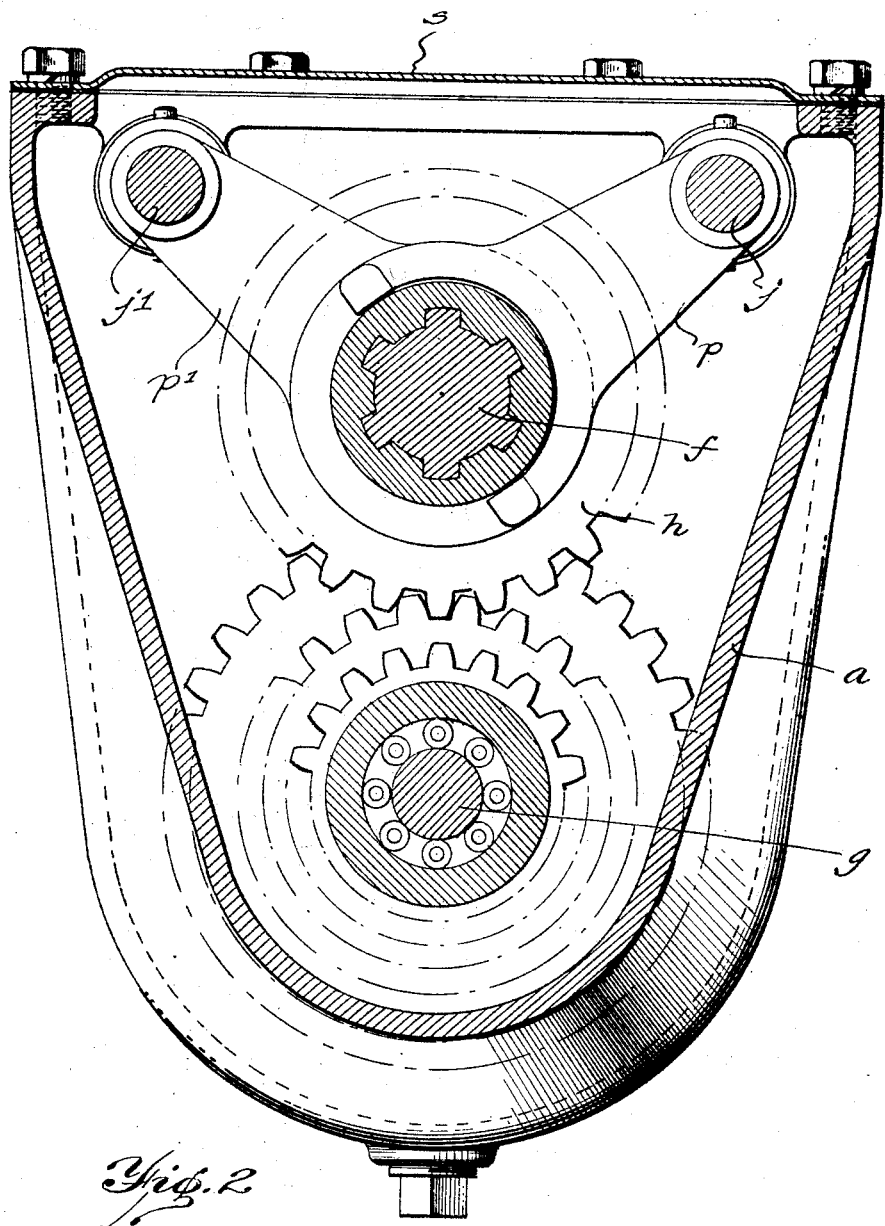
Fig. 2 is a cross section on the lines 2—2 of Fig. 1.

Now, in place of this construction I place the gear shifting rods $j$ and $j^1$ in the body of the transmission case and extend them forwardly out of the front of the case into the clutch chamber. The rods, it will be noticed from Fig. 2, are at the sides of the train of gears in the line of the driven shaft. The yokes or notches $k$, which are ordinarily provided on intermediate portions of the gear shifting rods and within the transmission case, are located on the extreme forward ends of the rods and within the clutch chamber. The gear shifting lever $m$ approximates a bell-crank lever in shape. It is provided with the usual ball fulcrum $n$ and fits into a spherical socket $o$ in the clutch housing cover plate $e$. A conical coil spring $r$ tends to keep the ball tightly in its socket in the usual way. It will be seen that the shafts are provided with gear shifting forks $p$ and $p^1$, adapted to engage in the grooves of the hubs of the sliding gears in the usual way.

This is all the mechanical construction that need to be described, as the other parts shown in the drawings are all well known construction in connection with transmission units, and they have nothing particularly to do with the invention here described and claimed. It will be noticed, however, that by eliminating the gear shifting lever from the top of the transmission case that the cover $s$ may set very much lower on the case. This permits the floor boards $t$ to lie much closer to the transmission. Furthermore, the incorporation of the gear shifting rods in the body of the transmission also lowers the permissible height of the transmission cover. It will also be noted that the gear shifting lever is completely removed from the floor boards of the driver's compartment and is laid well up on the toe boards $u$. This takes it away from a position where it is always in the way and where it is hard for the driver to get by the lever, especially in the smaller cars where the seat is not located very far back from the dash.

What I claim is:

In a motor car construction, a transmission calculated to permit the lowering of the floor boards, having in combination with the power unit and a clutch housing, a transmission housing containing speed reducing gears, a pair of slidable gear shifting rods slidably supported in the walls of the transmission housing, one located at each side of the upper train of gears and projecting below the top of such gears, a cover for said transmission housing wholly independent of the sliding rods, the said rods passing out of the forward end of the transmission case into the clutch housing, and a gear shifting lever having a ball and socket support directly over the clutch housing, and arranged to selectively engage and control the forward ends of said gear shifting rods.

In testimony whereof I have affixed my signature.

JAMES SCRIPPS BOOTH.